United States Patent [19]

Herschtal et al.

[11] 4,258,433
[45] Mar. 24, 1981

[54] DIGITAL DATA COMMUNICATION NETWORK HAVING DIFFERING DATA TRANSMISSION RATE CAPABILITIES

[75] Inventors: Ludwik Herschtal, North Balwyn; Alfred Zelenka, Carlton, both of Australia

[73] Assignee: L M Ericsson Pty. Ltd., Broadmeadows, Australia

[21] Appl. No.: 30,758

[22] Filed: Apr. 17, 1979

[30] Foreign Application Priority Data

Apr. 28, 1978 [AU] Australia .............................. PD4202

[51] Int. Cl.³ ............................................. H04L 5/14
[52] U.S. Cl. ........................................ 370/24; 178/3; 179/2 DP; 370/84; 370/24;84
[58] Field of Search ........... 179/15 BV, 15 BS, 2 DP; 178/69.1, 3

[56] References Cited

U.S. PATENT DOCUMENTS

| 3,536,840 | 10/1970 | Sullivan | 179/2 DP |
|---|---|---|---|
| 3,569,943 | 3/1971 | Mackie et al. | 364/200 |
| 3,676,858 | 7/1972 | Finch et al. | 364/200 |
| 3,862,373 | 1/1975 | Cohen et al. | 179/15 BV |
| 3,876,838 | 4/1975 | Boxall | 179/15 BV |
| 3,937,882 | 2/1976 | Bingham | 370/24 |
| 4,000,371 | 12/1976 | Ogawa | 178/3 |
| 4,069,392 | 1/1978 | Goldenberg et al. | 178/3 |

FOREIGN PATENT DOCUMENTS 1946694 3/1971 Fed. Rep. of Germany ..... 179/15 BV

Primary Examiner—Douglas W. Olms
Attorney, Agent, or Firm—Cushman, Darby & Cushman

[57] ABSTRACT

The invention relates to method of interconnecting terminal devices in a digital telephone network wherein either the terminal devices in question normally operate at different data rates or they are to be interconnected over data links in the network which normally operate at different data rates. The method involves firstly determining, by processor means at a switching point in the network, the normal data bit rate of two terminals to be interconnected as well as the normal data bit rate of the or each data link over which the connection is to be made. In the case where there is a difference in the normal data bit rates the processor initiates a procedure to send a digital bit stream to one or both of the terminals to cause the terminals to operate, in the course of the connection, at a common data rate equal to the lowest of the normal data bit rates of said terminals and said data link. A telephone adapted to operate at different data rates in response to receiving a digital bit stream at the new rate or a digital code word is also described and claimed 2 Claims, 3 Drawing Figures

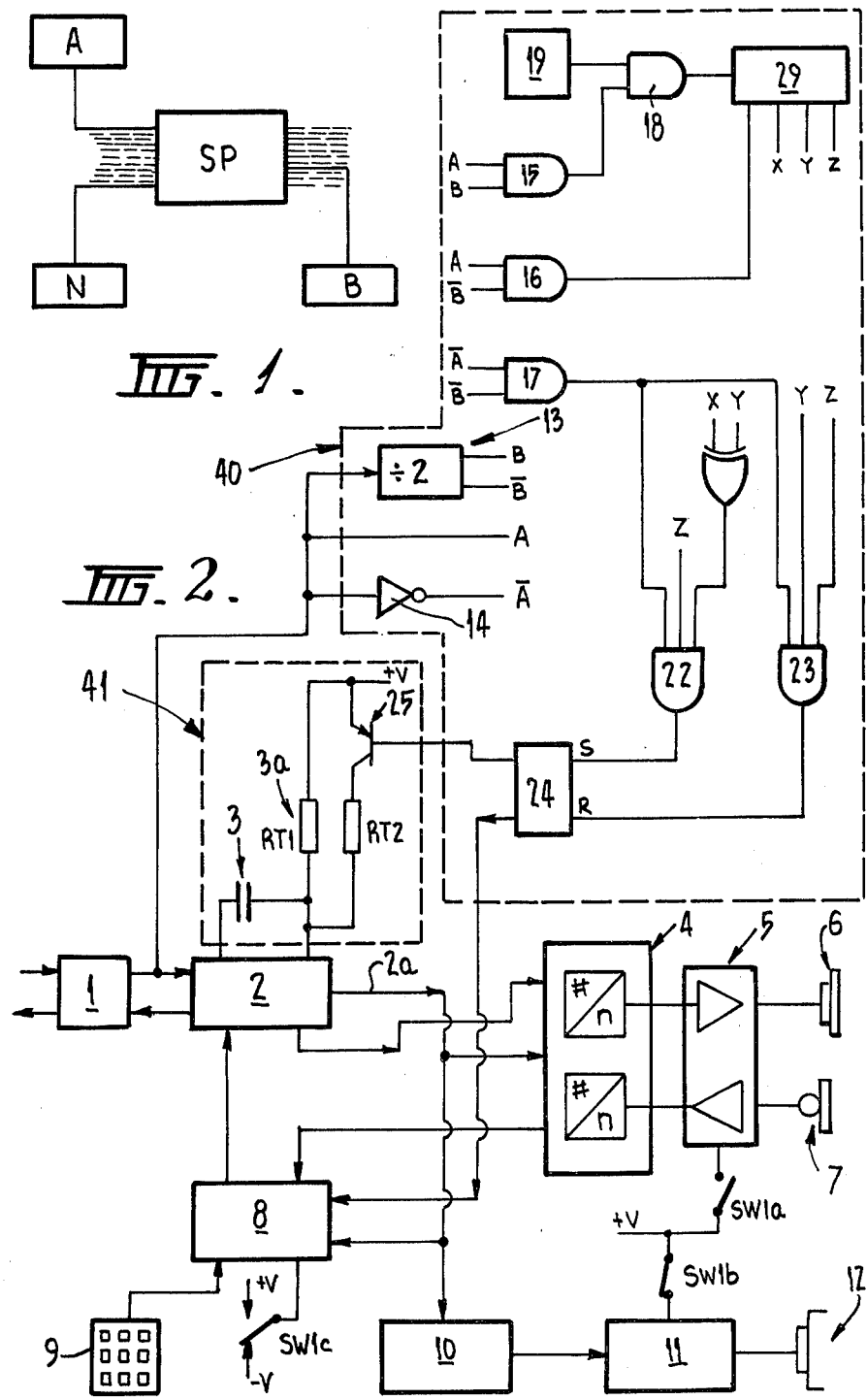

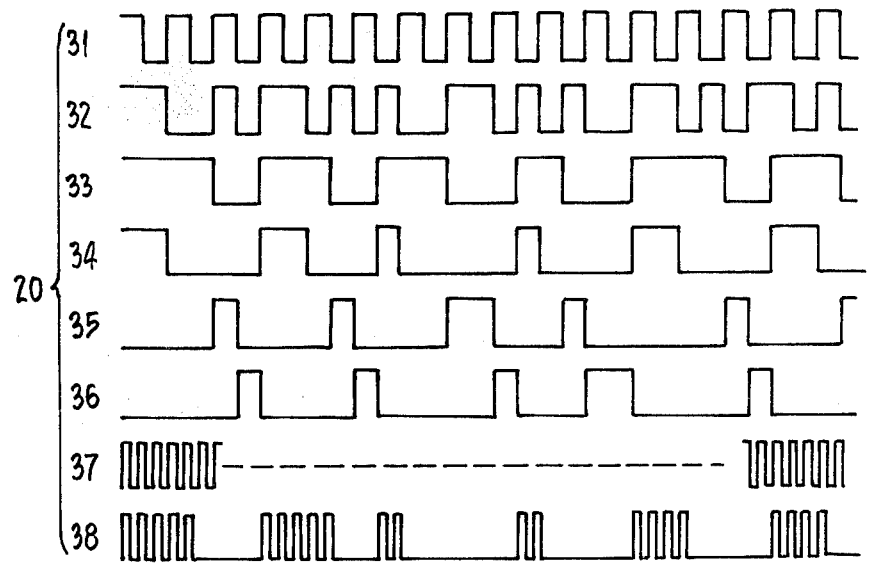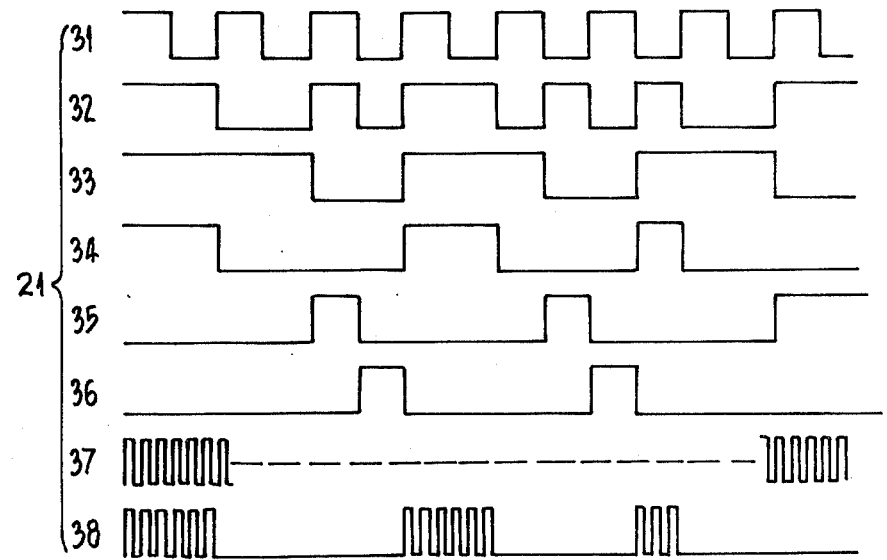
FIG. 3.

DIGITAL DATA COMMUNICATION NETWORK HAVING DIFFERING DATA TRANSMISSION RATE CAPABILITIES

The present invention relates to a digital data communication network wherein different parts of the network have different data transmission rate capabilities or limitations. In particular the invention relates to a method and apparatus for interconnecting terminal devices in such a system when either the terminal devices in question normally operate at different data rates or they are to be interconnected over data links which normally operate at different data rates.

The invention has particular utility in a digital telephone system, for example, but is clearly not limited thereto as it could be readily applied to other digital systems.

The need for the present invention may arise in a number of ways. For example, in a large digital telephone system a parent exchange may be operating at a first relatively high data bit rate to most of its dependant digital telephones which, because they are located relatively close to the exchange, are not bandwidth restricted by the interconnecting medium, that is, the cable. However, the exchange may also have some dependant telephones located at the end of long transmission lines or coupled thereto by derived links such as a radio system or satellite system with associated data modem. To conserve bandwidth in such cases it may be necessary for the distant dependant telephone to operate at some lower data bit rate with respect to the first bit rate.

In another similar example, the need for the present invention arises when one of the telephones connected to a first exchange operating at a first relatively high data bit rate is to communicate with one of the telephones connected to a second exchange operating at the same speed via a data link of slower speed capability. Similarly it may be necessary to communicate with a slow speed telephone connected to a distant exchange where a high speed data link is available and again the need for the present invention would arise.

Thus a problem arises whenever two telephones operating at different data rates are required to be connected together or two telephones operating at the same speed are required to be connected together via a slower speed data link.

An obvious way of overcoming the problem would be to adapt the terminals (telephones) working at the lower data bit rates to the network by means of interface units connected at the input to the first switching node or terminal exchange. Such interface units would convert the digital data back to analogue form and then encode the analogue information at the desired digital bit rate. This solution would prove relatively expensive and is furthermore not feasible in high security digital communication systems wherein encryption devices are used at the terminals to ensure that data cannot be intercepted and decoded in its passage through the system. In such security systems it would be necessary to decrypt at the interface units and this would further increase the expense of the system to a significant extent and would reduce the security.

It is thus an object of this invention to provide an improved method and apparatus for interconnecting terminal devices in a digital data network wherein terminal devices normally operate at different data bit rates or are to be interconnected via a data link having a different data bit rate to said terminals.

In order that the invention may be readily understood a particular embodiment will now be described with reference to the accompanying drawings which relate to a digital telephone system wherein the telephones transmit digital data to the network. In the drawings FIG. 1 is a schematic block diagram of a simplified network incorporating the present embodiment, FIG. 2 is a circuit block diagram of a digital telephone according to the embodiment and FIG. 3 is a timing diagram of data wave forms present in the telephone of FIG. 2.

Referring now to FIG. 1, the simplified system consists of a digital telephone A connected to a switching point or exchange SP and a further digital telephone B also connected to SP. Of course many other telephones would, in practice, be connected to the exchange SP. The need for the present invention is best described in the form of the following procedure for establishing a call between digital telephone A and digital telephone B. Assume telephone A normally operates at 32 KHz and telephone B can only operate at 16 KHz due to say bandwidth limitations on the link between telephone B and the switching point SP. A call is established in the following manner.

Assume telephone A originates the call. The line signals between A and SP and between B and SP are in the form of digital codes which are recognized by SP by continually monitoring the subscriber lines. This is normal procedure. The monitoring of the lines can be done in different ways for example, by multiplexing one type of code receiver to the 32 KHz telephones and another type of code receiver to the 16 KHz telephones or as done in this embodiment by employing the same code receiver for all lines but choosing the line signals such that a bit stream from telephone B has the same meaning to the code receiver as a bit stream from telephone A.

When register signalling has been received in SP the processor (not shown) in SP interrogates a B subscriber identification table. This table indicates that telephone B is limited to 16 KHz data rate transmission. The switching point SP calls telephone B by transmitting a call signal to telephone B at 16 KHz. Answer code from telephone B is transmitted to SP. The answer code from telephone B normally causes the call to be through connected. However, in the described embodiment, before through connection takes place the SP, as a result of the information obtained from the "B subscriber" identification table, will change the data rate to telephone A to 16 KHz. The data rate from telephone A to SP is slaved to the data rate sent from SP since, in this embodiment, the data is diphased data and clock is extracted at the remote telephones. The change in data rate at SP from telephone A is verified in SP by monitoring the bit stream from telephone A. At this point through connection takes place.

It should be apparent that a number of different switching points or exchanges SP may appear in the network between telephone A and telephone B. It could be in fact that in another situation telephone A and telephone B operate at the same data rate but a link between two exchanges necessary in the connection between telephone A and telephone B operates at a lower data rate and as a consequence for the purpose of the connection both telephone A and telephone B must operate at the lower data rate.

Reference should now be made to FIG. 2 which shows a basic circuit block diagram of a digital telephone incorporating circuitry for the purpose of enabling the telephone to adapt to two different digital data rates. For the purpose of the invention a telephone is required which will respond either to a code word sent from an exchange or to the bit rate of the incoming data to the telephone. In this embodiment it is intended that the telephone apparatus respond to the incoming data rate.

The main parts of the digital telephone of FIG. 2 comprise a line interface circuit 1 which isolates the four wire telephone line from the internal telephone circuitry and performs the necessary amplification and shaping of the signals in both directions of transmission, a clock extraction and diphase modem circuit 2 which regenerates the clock from the incoming diphased bit stream to provide a clock output on connection 2A, converts outgoing non-return to zero (NRZ) data to diphase modulated data and incoming diphase modulated data to NRZ, timing capacitor 3 and associated resistor 3a which are required by the clock extract circuit, the codec 4 which performs A/D and D/A conversion by means of a delta modulation technique, and the amplifier and filter unit 5 interfacing to the receiver 6 and sender 7. The telephone consists further of a code generator 8 which converts the digits from keyboard 9 into a serial digital pattern, a code receiver 10 which receives codes such as ring and alarm to operate the ringer unit 12 via a ring generator circuit 11. SW1 is a switch hook shown in the on-hook position.

The above items constitute a standard digital telephone.

The additional components described below are necessary to allow the telephone to adapt to two different incoming data rates. The data rates considered in this embodiment are 32 KHz and 16 KHz.

In FIG. 3 the wave forms for the 32 KHz data rate are shown by reference 20 and the wave forms for the 16 KHz data rate are shown by reference 21. In the respective groups 20 and 21 the wave forms 31 are the system clock signals shown for reference. The wave forms 32 are typical diphase modulated data bit streams. From these wave forms it can be seen that at 32 KHz the pulse periods consist of t and 2t whereas at 16 KHz they consist of 2t and 4t (t=15.625μs). In this embodiment the period of the incoming data is measured and the occurrence of the periods t and 4t is used to indicate the presence of 32 KHz and 16 KHz respectively.

In FIG. 2 flip-flop 13, invertor 14, gates 15, 16, 17 and 18, local oscillator 19, 3 bit binary counter 29, gates 21, 22 and 23 and RS flip-flop 24 form the period measuring circuit represented as block 40. Transistor 25 controlled by flip-flop 24 switches timing resistor RT2 in or out allowing the timing circuit represented as block 41 to adapt to the incoming data rate. In FIG. 3 the respective wave forms 33 are formed by dividing wave form 32 by two, in flip-flop 13 (FIG. 2). The purpose of doing this is to generate phases shown by patterns 34, 35 and 36 respectively in the groups 20 and 21 to facilitate the measurement of the data period. The phases are generated by gates 15, 16 and 17 in FIG. 2.

During the wave form 34 phase, gate 18 is open to allow a number of clock pulses from the local oscillator 19 to advance the binary counter 29 which has been cleared by wave form 35 phase. Wave form 36 phase transfers the state of the binary counter 29 to the RS flip-flop 24.

The periods measured will be t, 2t and 4t. With the local oscillator 19 operating at 104 KHz (waveform 37), a period of t will gate one or two clock pulses to the binary counter 29, a period 2t will register three or four pulses and a period 4t will register six or seven pulses. Waveform 38 represents the data out of oscillator 19 and into counter 29.

When one or two counts are registered in binary counter 29, gates 21 and 22 will set RS flip-flop 24 and when six or seven counts are registered in counter 29, gate 23 will reset flip-flop 24. All other counts in binary counter 29 are ignored. Thus when a period t is measured, resistor RT2 will be switched in parallel with RT1 by means of transistor 25 and RS flip-flop 24, enabling the extraction of clock at 32 KHz. When a period of 4t is measured flip-flop 24 and the transistor will remove the parallel RT2 enabling a clock rate of 16 KHz to be extracted.

The code generator 8 has a control input from RS flip-flop 24 enabling the signalling codes from the telephone to be independent of the clock rate. This simplifies code reception in the terminal exchanges.

The local oscillator 19 is a free running LC or emitter coupled oscillator requiring a precision of plus or minus 7.6% when used in the period measuring arrangement shown. A higher oscillator frequency together with a longer counter and more complex decoding will allow the use of an oscillator of lower precision. It is felt, however, that plus or minus 7.6% is not difficult to achieve over the required temperature range. It should be apparent to those skilled in the art that the invention is not limited to the embodiment described above. For example, the invention is not limited to digital telephone systems and other communication systems would be adapted to incorporate the present invention. Also the terminal devices could be arranged to adapt to more than two different digital bit rates. Insofar as the switching points or exchanges of the system are concerned it is only necessary for the local processor to be programmed in such a way as to be able to determine the limitations with regard to digital data rates to the terminal devices wishing to establish a connection. In other words the exchange processor merely interrogates a look up table to determine whether any data links or terminal devices involved in a connection are restricted in any way with regard to the data bit rate.

We claim:

1. A method for interconnecting two terminal devices in a digital data network wherein said terminals either operate normally at different data bit rates or operate at the same data bit rate and are required to be connected via a data link in the network, said data link operating at a reduced data bit rate compared with said terminals, characterized in that said method includes detecting at a switching point in the network when a first terminal has initiated a communication with a second terminal determining, by means of a processor at said switching point, whether said second terminal is adapted to normally operate at a different data bit rate to said first terminal and if said communication is via a data link in the network limited in operation to a data bit rate less than said normal bit rate of one or both said terminals, and sending a digital bit stream to one or both said terminals to cause said terminals to operate during said communication, at the lowest of the normal data bit rates of said terminals and said data link.

2. A method as defined in claim 1 wherein said network is a telephone network and said terminals are digital telephones which are slaved to a said switching point in the system network such that clock signal at each telephone is derived from digital data sent thereto from a said switching point which is a master switching point to the telephone, characterized in that, said step of determining the relative data rates of the first (calling subscriber) and second (called subscriber) terminals and the data link comprises utilizing said processor to interrogate a called subscriber identification table to determine the normal data bit rate capabilities of the called subscriber and any data link necessary in the connection and compare the information obtained from said identification table with information relevant to the normal data rate of the calling subscriber as apparent from digital data received at said switching point when said calling subscriber initiates a call and the digital bit stream sent to a telephone to alter the data bit rate is data at the new bit rate which causes the telephone to operate at the new data bit rate.

* * * * *